3,010,931
RESINOUS COMPOSITION COMPRISING A VINYL HALIDE POLYMER AND A NITRO-ETHYLBENZENE
Louis O. Raether, Webster Groves, Mo., assignor to Monsanto Chemical Company, St. Louis, Mo., a corporation of Delaware
No Drawing. Filed Dec. 8, 1958, Ser. No. 778,577
6 Claims. (Cl. 260—32.4)

This invention relates to new resinous compositions of matter having utility under widely-varied conditions. More particularly, the invention relates to the use of mono-nitro ethylbenzenes as plasticizers for vinyl halide-containing polymers.

The primary purpose of this invention is to provide improved plasticizers for vinyl halide containing polymers such as vinyl chloride. A further purpose of this invention is to provide new inexpensive resinous compositions which have desirable physical properties.

It has been found that mono-nitro ethylbenzenes are efficient and inexpensive plasticizers for vinyl halide-containing polymers such as polyvinyl chloride. The mono-nitro ethylbenzene compounds contemplated in this invention are represented by the formula:

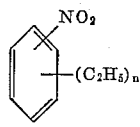

wherein $n$ is an integer from 1 to 5.

Compounds included in the above formula are, for example, o-nitroethylbenzene, 1-nitro-2,5-diethylbenzene, 1-nitro-2,3-diethylbenzene, 1-nitro-3,4,5-triethylbenzene, 1-nitro-2,3,4,5-tetraethylbenzene, and 1-nitro-2,3,4,5,6-pentaethylbenzene, etc.

While the ethylbenzenes may be nitrated by a number of different ways which are reported in the literature, I prefer to use a method similar to the one described in U.S. 2,370,558, which relates to the mono-nitration of aromatic hydrocarbons.

Briefly, it consists of preparing a "mixed acid," e.g., 55 parts sulfuric acid, 33 parts nitric acid, and 12 parts water. The mixed acid is gradually added to the ethylbenzene while maintaining the temperature at approximately 40° C. by cooling. After the addition of the mixed acid is complete, the mass is stirred for an hour, and during this time the temperature is maintained below 40° C. The agitation is stopped, the layers are allowed to settle, and the lower layer which contains the spent acid is separated. The oil layer is then washed with a sodium carbonate solution and dried.

The vinyl halide containing polymers which may be used in accordance with this invention include, among others, polyvinyl chloride and copolymers of vinyl chloride with other ethylenically unsaturated monomers copolymerizable therewith, as for example, vinylidene chloride, vinyl esters of carboxylic acids, e.g. vinyl acetate, vinyl propionate, vinyl butyrate, vinyl benzoate; esters of unsaturated acids, e.g. alkyl acrylates such as methyl acrylate, ethyl acrylate, propyl acrylate, butyl acrylate, allyl acrylate and the corresponding esters of methacrylic and ethacrylic acids; vinyl aromatic compounds, e.g. styrene, o-chlorostyrene, p-chlorostyrene, 2,5-dichlorostyrene, 2,4-dichlorostyrene, p-ethyl styrene, divinyl benzene, vinyl naphthalene, α-methyl styrene; unsaturated amides, such as acrylic acid amides, acrylic acid anilide; unsaturated nitriles, such as acrylonitrile, methacrylonitrile; esters of α,β-ethylenically unsaturated dicarboxylic acids, e.g. the methyl, ethyl, propyl, butyl, isobutyl, amyl, hexyl, heptyl, octyl, 2-ethylhexyl, allyl, methallyl and phenyl monoesters and diesters of maleic, crotonic, itaconic, fumaric acids and the like. The class of copolymers in which the predominant proportion, i.e. more than 70% by weight of the monomer units are vinyl chloride units, any balance being derived from an ethylenically unsaturated monomer, represents a preferred class of resins to be used in the compositions of this invention.

The present compounds impart good flexibility to vinyl chloride polymers at low temperatures, are compatible with such polymers, and show no exudation of plasticizer even at plasticizer content of up to 50%.

Although the quantity of plasticizer will depend upon the particular polymer to be plasticized and upon its molecular weight, it is generally found that compositions having from about 20% to 50% by weight of plasticizer will, in most cases, be satisfactory for general utility. Such quantity of plasticizer will generally remain as a permanent part of the vinyl resin, and the modified vinyl resin so prepared will not deteriorate by contact with liquid hydrocarbons or become embrittled by reason of the loss of plasticizer during use. The mono-nitro ethylbenzenes are of particular utility in the improvement of the stability of vinyl resins against hydrocarbon deterioration.

In evaluating plasticizer efficiency, use is made of the following empirical testing procedures:

*Compatibility.*—Visual inspection of the plasticized composition is employed, incompatibility of the plasticizer with the polymer being demonstrated by cloudiness and exudation of the plasticizer.

*Low-temperature flexibility.*—Low-temperature flexibility is one of the most important properties of elastomeric vinyl compositions. While many plasticizers will produce flexible compositions at room temperature, the flexibility of these compositions at low temperature may vary considerably, i.e., plasticized polyvinyl chloride compositions that are flexible at room temperature often become very brittle and useless at low temperatures. Low-temperature flexibility tests herein employed are according to the Clash-Berg method. This method determines the torsional flexibility of a plastic at various temperatures. The temperature at which the vinyl composition exhibits an arbitrarily established minimum flexibility is defined as the low-temperature flexibility of the composition. This value may also be defined as the lower temperature limit of the plasticized composition's usefulness as an elastomer.

*Volatility.*—Just as a decrease in temperature often results in decreased flexibility of a plasticized polymer composition, so does a decrease in plasticizer concentration when caused by volatilization of the plasticizer. Hence, plasticizers which are readily volatilized from the plasticized composition as a result of aging or heating are inefficient because, upon volatilization, the plasticized compositions become stiff and hard. The test for plasticizer volatility herein employed is that described by the American Society for Testing Materials under the designation D-1203-52T.

*Hydrocarbon extraction.*—The hydrocarbon solubility test performed with kerosene as a typical liquid hydrocarbon is determined by submerging a sample of the plasticized resin in kerosene at a constant temperature of 23° C. for a period of 24 hours at 80° C. and, thereafter, the extraction resulting from contact with the solvent is determined. The kerosene employed in this test has a boiling range of about 200° C. to 250° C., corresponding to an average hydrocarbon chain length of 13 carbon atoms.

*Water resistance.*—The amount of water absorption and the amount of leaching that takes place when the plasticized composition is immersed in distilled water for 24 hours is determined.

Of these tests, the compatibility is of primary importance, while the others are only critical for certain applications. If the plasticized polymer is to be subjected to elevated temperatures, a volatility of 4% to 10% is advantageous; otherwise, volatilities as high as 30% are often not objectionable. The volatilities and hydrocarbon extraction values of polymer-plasticized blends are difficult to predict and often have no apparent relationship to the physical constants of the plasticizer.

The invention is further illustrated, but not limited, by the following examples:

EXAMPLE 1

This example shows the preparation of nitro-diethylbenzene.

134 parts (1 mole) of diethylbenzene are charged into a vessel equipped with a suitable cooling jacket and agitator. While maintaining the temperature below 35° C. and constantly agitating, a stoichiometric amount plus a 3% excess of 33–35 mixed acids is added slowly over a two-hour period. Upon completion of the mixed acids addition, the reaction mixture is maintained at 30–35° C. for an additional hour. The agitation is stopped and the reactor charge is then transferred to a separating tank, and the lower layer (spent acid) is separated and returned to the reactor for a subsequent nitration. The upper layer is washed with water and sufficient sodium carbonate to obtain a pH of 7 and then dried by distillation. A yield of approximately 145 parts by weight of nitro-diethylbenzene, B.P. 267° C./760 mm., $n_D^{25}$ 1.5292, is obtained, which corresponds to a yield of about 80.5% based on the diethylbenzene charged.

EXAMPLE 2

Sixty parts of polyvinyl chloride and 40 parts by weight of the nitro-diethylbenzene obtained in Example 1 are mixed on a rolling mill to a homogeneous blend. During the milling there is observed substantially no fuming or discoloration. The molded sheet of the mixture is clear and transparent and substantially colorless. Testing of the molded sheet for low-temperature flexibility, according to the procedure described above, gives a value of −19° C., which value denotes good low-temperature properties. A test of the volatility characteristics of the composition gives a value of 30%. The hydrocarbon extraction test described above yields a value of 10.4% loss, which is significantly low when compared with a well-known plasticizer, such as dioctyl phthalate, which has a hydrocarbon extraction value from polyvinyl chloride amounting to 84.8% under similar conditions. Tests of the water resistance properties of the plasticized material employing the test procedure described above, indicate a solids loss of 2.9% and a 2.2% water absorption value.

EXAMPLE 3

A polyethylbenzene fraction, which comprises a mixture of tri-, tetra-, and penta-ethylbenzenes, recovered as the high boiler residue in the distillation of the ethylbenzenes obtained from the ethylation of benzene (a preliminary step in the production of styrene) is nitrated in the manner disclosed in Example 1, above. The product so obtained has the following properties:

Refractive index (25° C.) _____ 1.5650
Specific gravity 25/25° C. _____ 0.9686

EXAMPLE 4

Sixty parts of polyvinyl chloride and 40 parts by weight of the nitro-polyethylbenzene obtained in Example 3 are mixed on a rolling mill to a homogeneous blend. During the milling there is observed substantially no fuming or discoloration. The molded sheet of the mixture is clear and transparent and substantially colorless. Testing of the molded sheet for low-temperature flexibility yields a value of 2.5° C. A test of the volatility characteristics of the composition gives a value of 11.1%. The hydrocarbon extraction test gives a value of 2.8%. Tests of the water-resistance properties of the plasticized material indicate a solids loss of 0.33% and a 1.1% water absorption value.

EXAMPLE 5

*Comparison low temperature flexibility and Shore hardness values of nitroethylbenzene, nitrodiethylbenzene, nitrobenzene and nitrotoluene*

The following compositions comprising, respectively,

|  | Parts by Weight ||||
|---|---|---|---|---|
|  | A | B | C | D |
| polyvinyl chloride | 100 | 100 | 100 | 100 |
| nitro-diethylbenzene | 40 |  |  |  |
| nitrobenzene |  | 40 |  |  |
| o-nitrotoluene |  |  | 40 |  |
| o-nitroethylbenzene |  |  |  | 40 | were prepared by mixing polyvinyl chloride with the respective nitro compounds in the amounts set forth above, on differential speed rolls at a roll temperature of 160° C. to form a homogeneous composition which is removed from the roll in the form of crude sheets. From these crude sheets there were molded finished sheets which are about 0.040 inch in thickness, employing a molding cycle of three minutes at 160° C. (2000 p.s.i. mold pressure).

The low temperature flexibility value ($T_f$) as obtained by the Clash-Berg method and the Shore hardness ("A" scale) value of each of these compositions were measured and the results are reported in Table A below.

TABLE A.—PLASTICIZER PROPERTIES

| Composition | $T_f$, ° C. | Shore Hardness |
|---|---|---|
| A | −19 | 81 |
| B | +10.7 | 98 |
| C | +11.6 | 93 |
| D | −20.6 | 73 |

Similar results are obtained when the above nitroaromatic compounds are compared at the 20, 30, 60 and 75 phr. (parts of plasticizer per hundred parts by weight of resin) level. For example, the distinct differences in low temperature flex and Shore hardness values (at the 40 phr. level) between o-nitrotoluene and o-nitroethylbenzene is also evident at these other levels.

On substituting for the polyvinyl chloride used in the foregoing examples, other vinyl halide-containing resins, it is found that effective plasticization results are also obtained with such other resins, numerous examples of which are well known to those skilled in the art. Results similar to those obtained in the foregoing examples are also obtained when the polyvinyl chloride of the compositions of said examples is replaced by an equivalent amount of copolymer of 95 parts of vinyl chloride and 5 parts vinyl acetate, copolymer of 90 parts vinyl chloride and 10 parts vinylidene chloride, copolymer of 70 parts vinyl chloride and 30 parts of diethylmaleate.

In addition to the above described vinyl chloride containing polymers, similar polymers wherein the vinyl chloride is replaced, either in whole or in part, by other vinyl halides may be utilized. Typical of such other vinyl halides are vinyl bromide, vinyl fluoride, etc.

While the foregoing examples have been principally limited to compositions in which the ratio of plasticizer to polymer is 40:60, it is obvious that this can be varied over wide ranges, depending upon the properties desired. A plasticizer content of as low as 20% produces desirable plasticizing results. The present nitroethylbenzenes are compatible with vinyl halide-containing polymers over wide ranges of concentrations, up to 50% of the nitroethylbenzenes based on the total weight of the plasticized composition yielding desirable products.

When desired, mixtures of the mono-nitro ethylbenzene compounds and other plasticizers can be used, for example, such conventional plasticizers as diethyl phthalate, dibutyl sebacate, triethyl phosphate, trioctyl phosphate, and methylphthalyl ethylglycolate.

The plasticized vinyl halide-containing resin compositions of the present invention have good thermal stability; however, for many purposes, it may be advantageous to use known stabilizers in the plasticized compositions. Inasmuch as the nitro-ethylbenzenes are substantially unreactive with the commercially available heat and light stabilizers which are commonly employed with vinyl halide-containing resins, the presence of such materials in plasticized materials does not impair the valuable properties of the present plasticizers.

The foregoing description is given in illustration, and not in limitation, of the invention as set forth in the appended claims.

This application is a continuation-in-part of application Serial Number 598,513, filed July 18, 1956, now abandoned.

What is claimed is:

1. A resinous composition comprising a vinyl halide-containing polymer selected from the group consisting of homopolymers of vinyl halide and copolymers of vinyl halide with an ethylenically unsaturated comonomer; said copolymers containing at least 70% by weight of vinyl halide copolymerized therein and as a plasticizer therefor, a nitroethylbenzene of the structure:

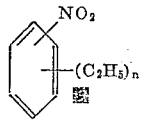

wherein $n$ is an integer of from 1 to 5, said nitroethylbenzene representing from about 20% to 50% of the composition.

2. A resinous composition comprising polyvinyl chloride and as a plasticizer therefor, a nitroethylbenzene of the structure:

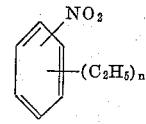

wherein $n$ is an integer of from 1 to 5, said nitroethylbenzene representing from about 20 to 50% of the composition.

3. A resinous composition comprising a copolymer of vinyl chloride with an ethylenically unsaturated comonomer which contains at least 70% by weight of vinyl chloride copolymerized therein, and as a plasticizer therefor, a nitroethylbenzene of the structure:

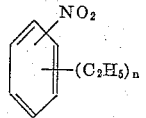

wherein $n$ is an integer of from 1 to 5, said nitroethylbenzene representing from about 20% to 50% of the composition.

4. A resinous composition comprising polyvinyl chloride and as a plasticizer therefor, o-nitroethylbenzene.

5. A resinous composition comprising polyvinyl chloride and as a plasticizer therefor, nitro-diethylbenzene.

6. A resinous composition comprising polyvinyl chloride and as a plasticizer therefor, nitro-polyethylbenzene.

References Cited in the file of this patent
UNITED STATES PATENTS 1,929,453    Semon _____ Oct. 10, 1933